(12) United States Patent
Ueda et al.

(10) Patent No.: US 12,704,406 B2
(45) Date of Patent: Aug. 11, 2026

(54) UV SENSOR HEAD AND WAVELENGTH CONVERSION MEMBER FOR UV SENSOR HEAD

(71) Applicant: NIPPON ELECTRIC GLASS CO., LTD., Otsu (JP)

(72) Inventors: Naoki Ueda, Otsu (JP); Minekazu Takada, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 54 days.

(21) Appl. No.: 18/575,559

(22) PCT Filed: Jun. 21, 2022

(86) PCT No.: PCT/JP2022/024662
§ 371 (c)(1),
(2) Date: Dec. 29, 2023

(87) PCT Pub. No.: WO2023/282050
PCT Pub. Date: Jan. 12, 2023

(65) Prior Publication Data

US 2024/0310211 A1 Sep. 19, 2024

(30) Foreign Application Priority Data

Jul. 5, 2021 (JP) ................................ 2021-111540
Nov. 29, 2021 (JP) ................................ 2021-193143

(51) Int. Cl.
*G01J 1/58* (2006.01)
*G01J 1/04* (2006.01)
*G01J 1/42* (2006.01)

(52) U.S. Cl.
CPC ............... *G01J 1/58* (2013.01); *G01J 1/0425* (2013.01); *G01J 1/0433* (2013.01); *G01J 1/429* (2013.01)

(58) Field of Classification Search
CPC .......... G01J 1/58; G01J 1/0425; G01J 1/0433; G01J 1/429
See application file for complete search history.

(56) References Cited

U.S. PATENT DOCUMENTS 3,838,282 A 9/1974 Harris
6,335,529 B1 * 1/2002 Sekii ......................... G01J 1/58 250/372

(Continued)

FOREIGN PATENT DOCUMENTS

EP 1788368 A1 5/2007
JP 2000258247 A * 9/2000 ......... H01L 31/0232

(Continued)

OTHER PUBLICATIONS

Official Communication issued in International Patent Application No. PCT/JP2022/024662, mailed on Aug. 23, 2022.

(Continued)

*Primary Examiner* — Uzma Alam
*Assistant Examiner* — Fani Polyzos Boosalis
(74) *Attorney, Agent, or Firm* — Keating & Bennett, LLP

(57) ABSTRACT

A UV sensor head is provided capable of increasing sensing sensitivity. A UV sensor head 1 that converts ultraviolet light into visible light and guides the converted visible light toward an optical fiber 11 includes a wavelength conversion member having an inorganic matrix and phosphor particles dispersed in the inorganic matrix.

18 Claims, 7 Drawing Sheets

(56) References Cited

U.S. PATENT DOCUMENTS

| | | | |
|---|---|---|---|
| 2013/0063020 | A1 | 3/2013 | Daicho |
| 2019/0032886 | A1 | 1/2019 | Daicho et al. |
| 2020/0035872 | A1 | 1/2020 | Furuyama et al. |
| 2021/0317367 | A1 | 10/2021 | Tatami et al. |
| 2022/0281137 | A1 | 9/2022 | Kunimoto |

FOREIGN PATENT DOCUMENTS

| | | | | | |
|---|---|---|---|---|---|
| JP | 2001021413 | A | * | 1/2001 | |
| JP | 2002214041 | A | | 7/2002 | |
| JP | 2010108965 | A | | 5/2010 | |
| JP | 2011095083 | A | | 5/2011 | |
| JP | 2014031488 | A | * | 11/2012 | ............ C09K 11/08 |
| JP | 2014234487 | A | | 12/2014 | |
| JP | 5807780 | B2 | * | 11/2015 | ............ H01L 33/50 |
| JP | 2020-45255 | A | * | 9/2018 | ............ C03C 14/00 |
| JP | 2020-045255 | A | | 3/2020 | |
| TW | 201530101 | A | | 8/2015 | |
| TW | 202046521 | A | * | 12/2020 | .......... H10H 20/851 |
| WO | 00/11440 | A1 | | 3/2000 | |
| WO | 2011145238 | A1 | | 11/2011 | |
| WO | 2017/159696 | A1 | | 9/2017 | |
| WO | 2018083903 | A1 | | 5/2018 | |
| WO | 2021015261 | A1 | | 1/2021 | |
| WO | 2021079747 | A1 | | 4/2021 | |

OTHER PUBLICATIONS

Official Communication issued in corresponding European Patent Application No. 22837467.4 mailed on May 16, 2025, 10 pages.

Official Communication issued in corresponding Chinese Patent Application No. 202280030700.8, mailed on May 23, 2026, 7 pages.

* cited by examiner

UV SENSOR HEAD AND WAVELENGTH CONVERSION MEMBER FOR UV SENSOR HEAD

TECHNICAL FIELD

The present invention relates to a UV sensor head that converts ultraviolet light into visible light and guides the converted visible light toward an optical fiber, and a wavelength conversion member used for the UV sensor head.

BACKGROUND ART

In recent years, the use of ultraviolet light in various applications such as UV cleaning, UV sterilization, and UV curing has been studied, and the development of devices using ultraviolet light has also become more and more extensive. However, it is difficult to identify the intensity and degree of deterioration of an ultraviolet light source because ultraviolet light cannot be detected by the human eye. A gallium nitride (GaN) photodiode (PD) or the like is known as a module for detecting ultraviolet light, but this is expensive and thus difficult to generalize.

As such, Patent Literature 1 below proposes an ultraviolet detector that converts ultraviolet rays into visible light using a wavelength conversion element and detects the amount of the converted visible light. In the ultraviolet detector described in Patent Literature 1, fluorescent glass (glass in which a composition is doped with a fluorescent component) is disclosed as a material that converts ultraviolet light into visible light.

CITATION LIST

Patent Literature

Patent Literature 1: WO 00/11440

SUMMARY OF INVENTION

Technical Problem

A UV sensor has been developed that converts ultraviolet light into visible light and guides the converted visible light through an optical fiber to sense the converted visible light. Fluorescent glass as disclosed in Patent Literature 1 is attached to a sensor head of such a UV sensor and is irradiated with ultraviolet light to convert the ultraviolet light into visible light. However, when fluorescent glass is used in the UV sensor head, it is difficult to sufficiently increase sensing sensitivity.

It is an object of the present invention to provide a UV sensor head capable of increasing sensing sensitivity and a wavelength conversion member used for the UV sensor head.

Solution to Problem

A UV sensor head according to the present invention is a UV sensor head that converts ultraviolet light into visible light and guides the converted visible light toward an optical fiber, the UV sensor head comprising a wavelength conversion member including an inorganic matrix and phosphor particles dispersed in the inorganic matrix.

In the present invention, it is preferable that a content of the phosphor particles in the wavelength conversion member be 0.01 volume % or more and 20 volume % or less.

It is preferable that the UV sensor head of the present invention further include a tubular body having a first end and a second end facing each other and a side surface connecting the first end and the second end, the side surface being provided with a cutout portion, in which the wavelength conversion member is housed inside the tubular body, and the wavelength conversion member is arranged to overlap the cutout portion in a plan view.

In the present invention, when a direction in which the first end and the second end are connected is defined as a lengthwise direction and the first end is an end provided on the optical fiber side, the wavelength conversion member may have a protrusion that protrudes toward the first end side beyond the cutout portion in the lengthwise direction. In this case, it is preferable that a ratio of a length of the protrusion of the wavelength conversion member to a length of the cutout portion in the lengthwise direction (protrusion/cutout portion) be 0.01 or more and 1 or less.

In the present invention, it is preferable that a filter that transmits ultraviolet light and absorbs or reflects visible light be provided on the cutout portion. In this case, it is preferable that the filter be made of glass.

In the present invention, it is preferable that when the first end is an end provided on the optical fiber side, a rod made of the wavelength conversion member be inserted from the second end side of the tubular body.

In the present invention, it is preferable that the UV sensor head further include a lid member closing the second end side of the tubular body, in which the rod is attached to the lid member.

In the present invention, it is preferable that the inorganic matrix be a glass matrix.

A wavelength conversion member for a UV sensor head according to the present invention is a wavelength conversion member used for a UV sensor head that converts ultraviolet light into visible light and guides the converted visible light toward an optical fiber, the wavelength conversion member including an inorganic matrix and phosphor particles dispersed in the inorganic matrix. In this case, it is also preferable that a content of the phosphor particles in the wavelength conversion member be 0.01 volume % or more and 20 volume % or less.

Advantageous Effects of Invention

According to the present invention, it is possible to provide a UV sensor head capable of increasing sensing sensitivity and a wavelength conversion member used for the UV sensor head.

DESCRIPTION OF EMBODIMENTS

Figure 1:
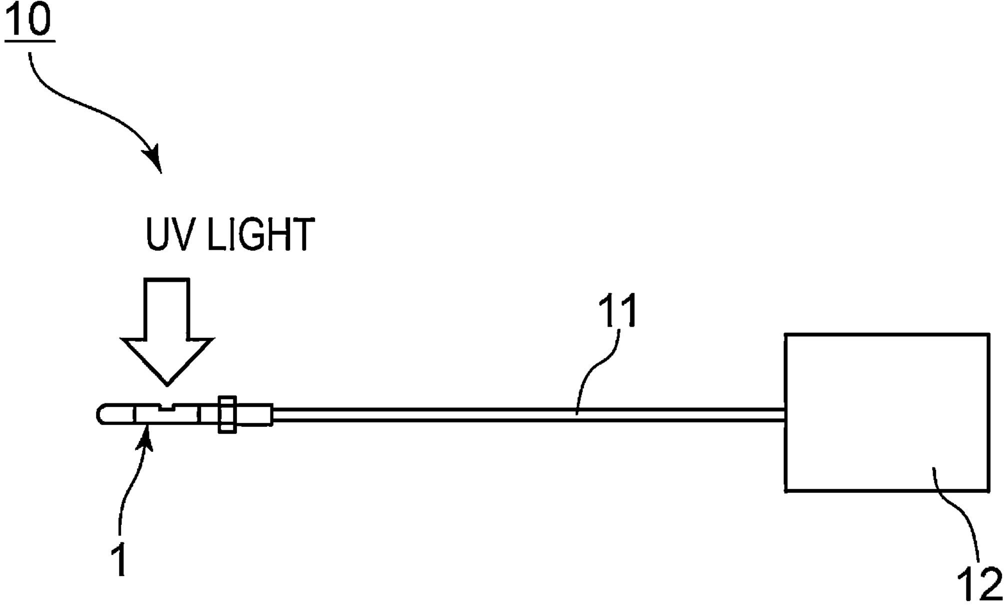
FIG. 1 is a schematic side view illustrating a UV sensor that uses a UV sensor head according to an embodiment of the present invention.

Preferred embodiments will be described below. The following embodiments are merely examples and the present invention is not limited to the following embodiments. In the drawings, members having substantially the same function may be referred to by the same reference numerals.

UV Sensor Head

Figure 2:
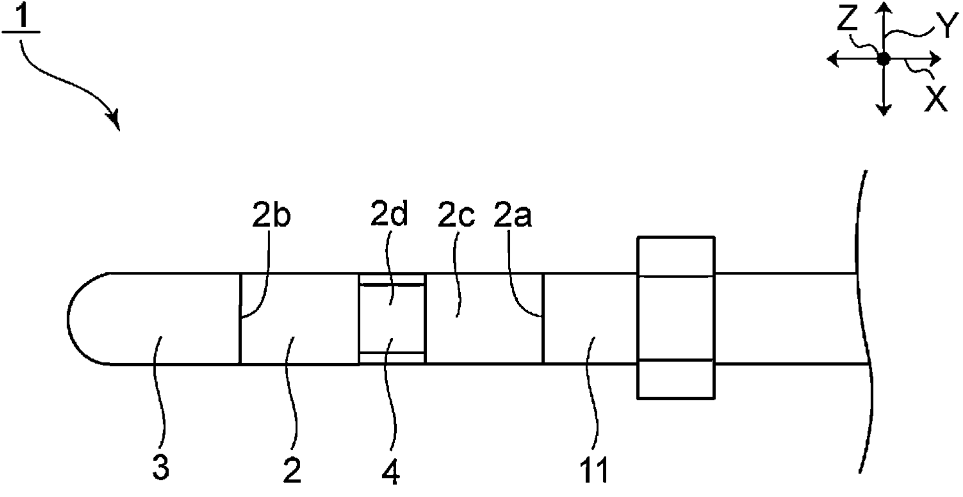
FIG. 2 is a schematic plan view illustrating the UV sensor head according to the embodiment of the present invention.
Figure 3:
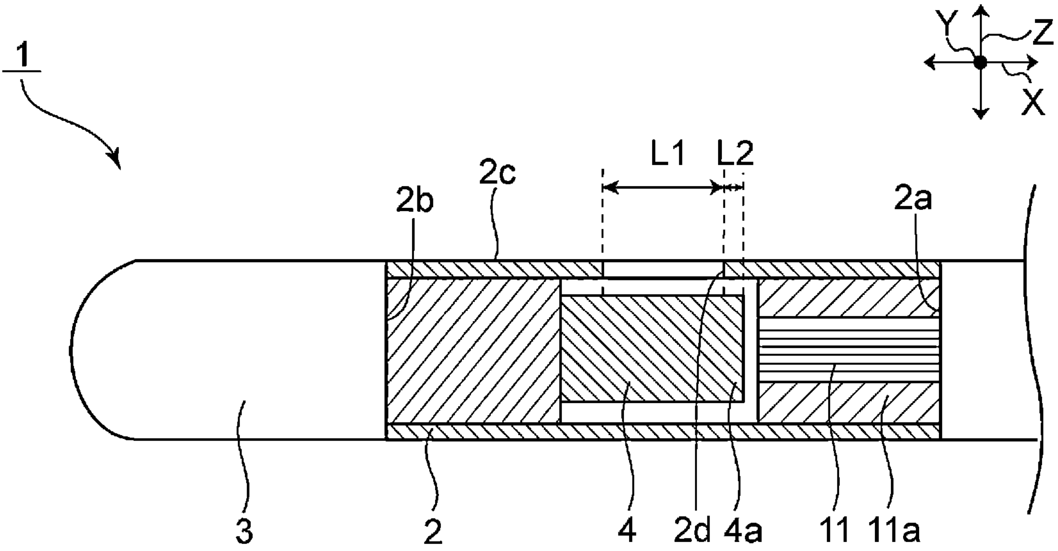
FIG. 3 is a schematic cross-sectional view of a tubular body portion of the UV sensor head according to the embodiment of the present invention.
Figure 4:
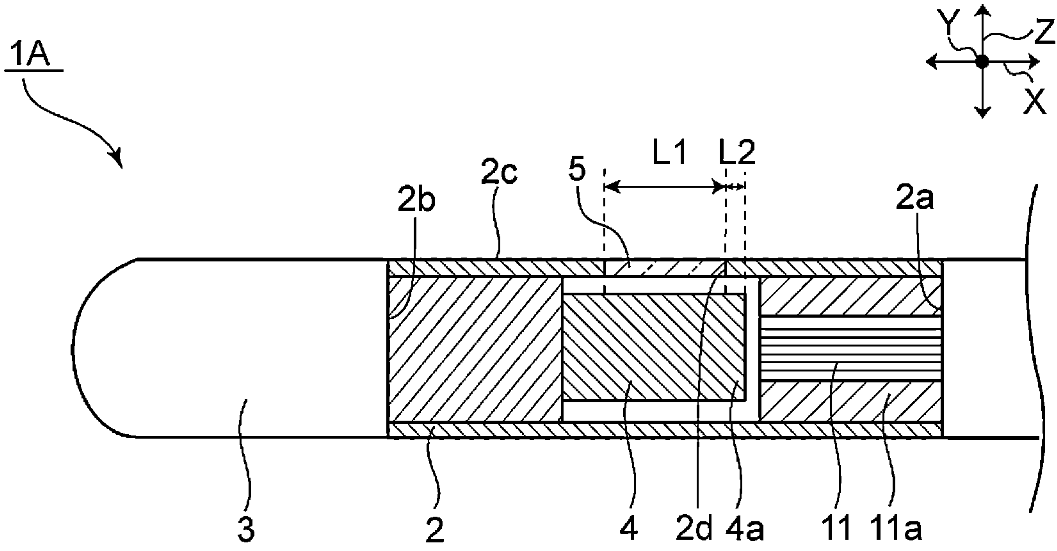
FIG. 4 is a schematic cross-sectional view of a tubular body portion of a UV sensor head according to another embodiment of the present invention.
Figure 5:
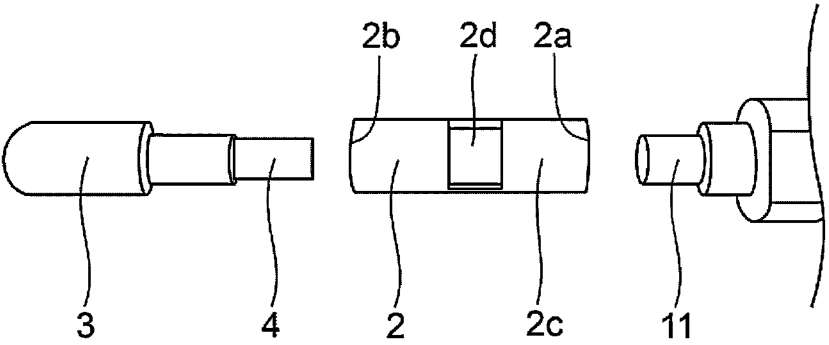
FIG. 5 is a schematic perspective view illustrating each part of the UV sensor head according to the embodiment of the present invention.

FIG. 1 is a schematic side view illustrating a UV sensor that uses a UV sensor head according to an embodiment of the present invention. FIG. 2 is a schematic plan view illustrating the UV sensor head according to the embodiment of the present invention. FIG. 3 is a schematic cross-sectional view of a tubular body portion of the UV sensor head according to the embodiment of the present invention. FIG. 4 is a schematic cross-sectional view of a tubular body portion of a UV sensor head according to another embodiment of the present invention. FIG. 5 is a schematic perspective view illustrating each part of the UV sensor head according to the embodiment of the present invention.

As illustrated in FIG. 1, a UV sensor head 1 is a sensor head used for a UV sensor 10. The UV sensor head 1 of the UV sensor 10 is irradiated with ultraviolet light (UV light). The ultraviolet light with which the UV sensor head 1 is irradiated is converted into visible light. The visible light produced through conversion of the UV sensor head 1 is guided to a detector 12 through an optical fiber 11 and monitored by the detector 12. In the UV sensor 10, ultraviolet light with which the UV sensor head 1 is irradiated is converted into visible light and then monitored by the detector 12 in this manner.

The UV sensor head 1 includes a tubular body 2, a lid member 3, and a wavelength conversion member 4. The shape of the tubular body 2 is substantially cylindrical. Of course, the shape of the tubular body 2 may be substantially square tubular and is not particularly limited. The tubular body 2 can be made of, for example, metal. The length of the tubular body 2 can be, for example, 1 mm or more and 50 mm or less. The inner diameter of the tubular body 2 can be, for example, 1 mm or more and 10 mm or less.

The tubular body 2 has a first end 2*a* and a second end 2*b* facing each other. The tubular body 2 also has a side surface 2*c* connecting the first end 2*a* and the second end 2*b*. The side surface 2*c* of the tubular body 2 is provided with a cutout portion 2*d*.

As illustrated in FIG. 2, the first end 2*a* of the tubular body 2 is an end on the optical fiber 11 side. In the present embodiment, the optical fiber 11 is joined to the first end 2*a* of the tubular body 2 via a connector 11*a* illustrated in FIG. 3. Specifically, the connector 11*a* through which the optical fiber 11 is inserted and the tubular body 2 are joined by being fitted to each other. The optical fiber 11 may be joined to the tubular body 2 by other methods such as an adhesive or a screw structure, but need not be joined to the tubular body 2. The connector 11*a* can be made of, for example, metal.

In the present embodiment, a gap is formed between an end face of the wavelength conversion member 4 and an end face of the optical fiber 11. This can suppress the wavelength conversion member 4 and the optical fiber 11 from rubbing against each other and causing scratches on the end faces or from breaking. However, it is not always necessary to form a gap between the end face of the wavelength conversion member 4 and the end face of the optical fiber 11, and the two end surfaces may also be in contact with each other.

Note that an antireflection film may be formed on the end face of the wavelength conversion member 4 and/or the end face of the optical fiber 11. By doing so, visible light generated by the wavelength conversion member 4 can more easily be guided to the optical fiber 11. A known dielectric multilayer film or the like can be used as the antireflection film. Alternatively, a refractive index matching agent layer having an intermediate refractive index that is between those of the wavelength conversion member 4 and the optical fiber 11 may be provided between the end face of the wavelength conversion member 4 and the end face of the optical fiber 11.

As in a UV sensor head 1A illustrated in FIG. 4, a filter 5 (a band pass filter) which transmits ultraviolet light and absorbs or reflects visible light may be provided on the cutout portion 2*d* to limit excitation light incident on the wavelength conversion member 4 to ultraviolet light. By doing so, even if phosphor particles that are excited by visible light are used, it is possible to more reliably prevent the phosphor particles from being excited and emitting fluorescence when the UV sensor head 1A is used in an environment where the UV sensor head 1A is irradiated with visible light from a fluorescent lamp or the like. This makes it possible to more reliably provide the UV sensor head 1A that detects only ultraviolet light.

As a characteristic of the filter 5, total light transmittance at a thickness of 1 mm for a wavelength from 250 nm to 380 nm is preferably 10% or more, more preferably 50% or more, and still more preferably 80% or more. Total light transmittance at a thickness of 1 mm in a wavelength range of 380 nm to 780 nm is preferably 50% or less, more preferably 25% or less, and still more preferably 10% or less. Total light transmittance at a thickness of 1 mm in a wavelength range of 400 nm to 700 nm is preferably 30% or less, more preferably 10% or less, and still more preferably 5% or less. Total light transmittance at a thickness of 1 mm in a wavelength range of 420 nm to 600 nm is preferably 10% or less, more preferably 5% or less, and still more preferably 1% or less.

Examples of the filter 5 include a filter made of glass (a glass plate). Specifically, examples of the filter 5 include a filter made of an ultraviolet transmitting and visible light absorbing glass which is glass containing an element that absorbs visible light. Examples of the element that absorbs visible light include Ni, Co, and Ti. These are usually included in a glass composition as components such as NiO, CoO and $TiO_2$. Among these, NiO and CoO are preferable because NiO and CoO absorb relatively little ultraviolet light, and can absorb visible light without decreasing sensing sensitivity of the UV sensor head 1A. The total content (in mass %) of NiO, CoO and $TiO_2$ in the glass composition is preferably 1% to 25%, more preferably 3% to 20%, and still more preferably 5% to 15%. If the content of these components is too low, it may be difficult to obtain sufficient visible light absorption performance. On the other hand, if the content of these components is too high, vitrification may be difficult. The content of one of NiO, CoO and $TiO_2$ and the total content of two thereof are each preferably 1% to 25%, more preferably 3% to 20%, and still more preferably 5% to 15%.

When the filter 5 is made of glass, the thickness thereof is preferably 0.2 mm to 3.0 mm, more preferably 0.3 mm to 2.0 mm, and still more preferably 0.4 mm to 1.0 mm. If the thickness of the filter 5 is too small, it tends to be difficult to obtain sufficient visible light absorption performance. Further, the mechanical strength of the filter 5 also tends to be insufficient. On the other hand, if the thickness of the filter 5 is too large, it tends to be difficult to reduce the size of the UV sensor head 1A.

A dielectric multilayer film that reflects visible light (for example, a dielectric multilayer film formed on the surface of a glass plate) can also be used as the filter 5. The dielectric multilayer film has a structure in which low refractive index dielectric layers with a relatively low refractive index and high refractive index dielectric layers with a relatively high refractive index are alternately laminated. The low refractive index dielectric layers can be formed of, for example, silicon oxide. The high refractive index dielectric layers can be formed of, for example, titanium oxide, niobium oxide, lanthanum oxide, tantalum oxide, or zirconium oxide. However, the dielectric multilayer film may fail to obtain sufficient filter functionality in an environment where visible light is incident on the surface of the filter from a direction other than a direction perpendicular to the surface of the filter, because the reflectance of visible light of the dielectric multilayer film changes depending on the angle of incidence. On the other hand, the ultraviolet transmitting visible light absorbing glass is less likely to cause such problems and can thus easily obtain a desired band-pass function. The ultraviolet transmitting visible light absorbing glass and the dielectric multilayer film may also be used in combination. In this case, the deterioration of the visible light absorption performance of the ultraviolet transmitting visible light absorbing glass when the thickness thereof is reduced can be compensated for by the dielectric multilayer film and thus a reduction in the size of the UV sensor head 1A can be achieved by reducing the thickness of the filter 5.

Returning to FIG. 3, the second end 2*b* of the tubular body 2 is closed with a lid member 3. Specifically, the lid member 3 and the tubular body 2 are joined by being fitted to each other. The lid member 3 and the tubular body 2 may be joined by other methods such as an adhesive or a screw structure. In the present embodiment, the shape of the lid member 3 is substantially cylindrical. Of course, the shape of the lid member 3 is not particularly limited. The lid member 3 can be made of, for example, metal.

The rod-shaped wavelength conversion member 4 is attached to a tip of the lid member 3. The rod of the wavelength conversion member 4 is inserted from the second end 2*b* side of the tubular body 2. The wavelength conversion member 4 includes an inorganic matrix and phosphor particles dispersed in the inorganic matrix. Such a wavelength conversion member 4 is housed inside the tubular body 2 and is arranged to overlap the cutout portion 2*d* in a plan view.

In the present embodiment, the wavelength conversion member 4 is attached to the tip of the lid member 3 with an adhesive. The wavelength conversion member 4 may be attached to the tip of the lid member 3 by other methods, which are not particularly limited. The lid member 3 need not be provided as long as the wavelength conversion member 4 is arranged inside the tubular body 2 such that the wavelength conversion member 4 overlaps the cutout portion 2*d* in a plan view.

In the present embodiment, the wavelength conversion member 4 is arranged such that the wavelength conversion member 4 includes an entire region in which the cutout portion 2*d* is provided in a plan view. It is desirable that the wavelength conversion member 4 be arranged to overlap the entire region in which the cutout portion 2*d* is provided as in the present embodiment, as long as the wavelength conversion member 4 is arranged to at least partially overlap the region where the cutout portion 2*d* is provided in a plan view. The area of the cutout portion 2*d* in a plan view can be, for example, 0.1 $mm^2$ or more and 20 $mm^2$ or less.

When a direction in which the first end 2*a* and the second end 2*b* are connected is defined as a lengthwise direction X in FIGS. 2 and 3, the wavelength conversion member 4 may have a substantially cylindrical shape extending in the lengthwise direction X. Of course, the shape of is not particularly limited and the wavelength conversion member 4 may have a shape such as a substantially rectangular parallelepiped shape.

The length of the wavelength conversion member 4 in the lengthwise direction X can be, for example, 0.2 mm or more and 5 mm or less. The diameter of the wavelength conversion member 4 can be, for example, 0.5 mm or more and 4 mm or less.

In the UV sensor head 1 of the present embodiment, the wavelength conversion member 4 is irradiated with ultraviolet light through the cutout portion 2*d*. The wavelength conversion member 4 converts the ultraviolet light into visible light and guides the visible light to the optical fiber 11. The visible light guided to the optical fiber 11 is finally guided to and monitored by the detector 12.

A feature of the present embodiment is that the wavelength conversion member 4 included in the UV sensor head 1 includes an inorganic matrix and phosphor particles dispersed in the inorganic matrix. Thus, the UV sensor head 1 can effectively increase sensing sensitivity.

In the related art, fluorescent glass is attached to the sensor head of a UV sensor, which converts ultraviolet light into visible light and guides the converted visible light through an optical fiber to sense the converted visible light, and the fluorescent glass is irradiated with ultraviolet light to convert the ultraviolet light into visible light.

However, fluorescent glass having a composition doped with a fluorescent component has a weak emission intensity due to little internal scattering, which causes the problem that sensing sensitivity cannot be sufficiently increased. If the number of fluorescent components in the glass increases, vitrification becomes unstable and thus the content of fluorescent components in the fluorescent glass cannot be increased sufficiently, causing the problem that sensing sensitivity cannot be sufficiently increased.

On the other hand, in the UV sensor head 1 of the present embodiment, the wavelength conversion member 4 contains an inorganic matrix and phosphor particles dispersed in the inorganic matrix, such that light internally scatters and emission intensity can be increased, and as a result, sensing sensitivity can be effectively increased. In the UV sensor head 1 of the present embodiment, sensing sensitivity can also be easily adjusted by adjusting the concentration of phosphor particles.

In the present embodiment, the content of phosphor particles in the wavelength conversion member 4 is preferably 0.01 volume % or more, more preferably 0.1 volume % or more, still more preferably 0.25 volume % or more, and especially preferably 0.5 volume % or more, and is preferably 20 volume % or less, more preferably 15 volume % or less, and still more preferably 10 volume % or less. When the content of phosphor particles is the above lower limit or more, emission intensity can be further increased and sensing sensitivity can be increased more effectively. Also, when the content of phosphor particles is the above upper limit or less, sensing sensitivity can be increased more effectively. This point can be described as follows.

If the content of phosphor particles contained in the wavelength conversion member 4 as illustrated in FIG. 3 is too high, ultraviolet light is likely to be wavelength-converted on the surface of the wavelength conversion member 4 and visible light may be less likely to be guided to the optical fiber 11. Because the wavelength conversion member 4 is a scattering body, the higher the concentration of phosphor particles, the larger the scattering factor, and the wavelength-converted visible light may be easily scattered by other phosphor particles. On the other hand, if the content of phosphor particles is reduced, ultraviolet light easily reaches the inside of the wavelength conversion member 4 and is easily wavelength-converted. In this manner, the concentration of phosphor particles is optimized such that the ultraviolet light is easily wavelength-converted near a cross-sectional center of the wavelength conversion member 4. Accordingly, visible light can be more easily guided to the optical fiber 11 and sensing sensitivity can be increased more effectively.

In the present embodiment, the wavelength conversion member 4 also has a protrusion 4*a* that protrudes toward the first end 2*a* side beyond the cutout portion 2*d* in the lengthwise direction X as illustrated in FIG. 3. Providing such a protrusion 4*a* serves to absorb, by phosphor particles contained therein, ultraviolet light which is incident through the cutout portion 2*d* and scattered toward the optical fiber 11 in the inorganic matrix under the influence of phosphor particles, and thus has the effect of limiting leakage of ultraviolet light to the optical fiber 11. This limits deterioration of a light-receiving element in the detector 12 due to receiving ultraviolet light, and as a result, can increase the reliability of sensing more effectively.

In the present embodiment, the ratio (L2/L1) of the length L2 of the protrusion 4*a* to the length L1 of the cutout portion 2*d* in the lengthwise direction X is preferably 0.001 or more, more preferably 0.01 or more, and still more preferably 0.1 or more. On the other hand, the scattering of visible light inside the wavelength conversion member 4 is increased and is less likely to be guided to the optical fiber 11 because the wavelength conversion member 4 is a scatterer, if L2/L1 is too large. Thus, L2/L1 is preferably 1 or less, more preferably 0.75 or less, and still more preferably 0.5 or less. This can limit leakage of ultraviolet light in addition to more easily guiding visible light to the optical fiber 11 and more effectively increasing sensing sensitivity.

Because the UV sensor head 1 of the present embodiment can effectively increase sensing sensitivity, it is possible to detect even weak light without noise and identify even minute deterioration or the like of the ultraviolet light source.

Hereinafter, the wavelength conversion member used for the UV sensor head of the present invention such as the UV sensor head 1 will be described in detail.

Wavelength Conversion Member

A wavelength conversion member for a UV sensor head of the present invention (may hereinafter simply be referred to as a "wavelength conversion member") is a wavelength conversion member used for a UV sensor head that converts ultraviolet light into visible light and guides the converted visible light toward the optical fiber. The wavelength conversion member includes an inorganic matrix and phosphor particles dispersed in the inorganic matrix. Such a wavelength conversion member can increase sensing sensitivity when used for the UV sensor head.

The total light transmittance of the inorganic matrix at a thickness of 1 mm for a wavelength from 250 nm to 280 nm is not particularly limited, but is preferably 0.1% to 80%, more preferably 10% to 80%, still more preferably 30% to 80%, and especially preferably 50% to 80%.

If the total light transmittance of the inorganic matrix is too low, ultraviolet light is excessively absorbed by the inorganic matrix, making it difficult to obtain a desired emission intensity. On the other hand, if the total light transmittance of the inorganic matrix is too high, ultraviolet excitation light that has not been wavelength-converted tends to leak outside.

The inorganic matrix is not particularly limited and a glass matrix, a ceramic matrix, or the like can be used.

Examples of the glass matrix include a matrix that contains, for example, 30% to 85% $SiO_2$, 0% to 35% $B_2O_3$, 0% to 25% $Al_2O_3$, 0% to 10% $Li_2O+Na_2O+K_2O$, and 0% to 45% MgO+CaO+SrO+BaO in mol %. Why the glass composition is limited in this way will be described below. In the following description of each component, "%" means "mol %" unless otherwise specified.

$SiO_2$ is a component that forms a glass network and has the effect of improving the ultraviolet transmittance and the devitrification resistance. $SiO_2$ also has the effect of improving the weather resistance and mechanical strength. The content of $SiO_2$ is preferably 30% to 85%, more preferably 40% to 80%, and still more preferably 50% to 75%, and especially preferably 55% to 70%. If the content of $SiO_2$ is too low, it is difficult to obtain the above effects. On the other hand, if the content of $SiO_2$ is too high, the sintering temperature becomes high and thus phosphor particles tend to deteriorate during the production of the wavelength conversion member. The fluidity of glass powder during firing also becomes poor and air bubbles tend to remain in the glass matrix after firing. The ultraviolet transmittance may also become too high.

$B_2O_3$ is a component that decreases the melting temperature and improves the meltability. $B_2O_3$ does not reduce the ultraviolet transmittance so much and has the effect of limiting the ultraviolet absorption by alkali metal components or alkaline earth metal components. The content of $B_2O_3$ is preferably 0% to 35%, more preferably 0% to 20%, still more preferably 1% to 15%, even more preferably 2% to 10%, especially preferably 3% to 8%, and most preferably 4% to 7%. If the content of $B_2O_3$ is too high, the weather resistance tends to decrease. The ultraviolet transmittance may also become too high.

$Al_2O_3$ is a component that improves weather resistance and mechanical strength. Similar to $B_2O_3$, $Al_2O_3$ has the effect of limiting the ultraviolet absorption by alkali metal components or alkaline earth metal components. The content of $Al_2O_3$ is preferably 0% to 25%, more preferably 0.1% to 20%, still more preferably 1% to 10%, and especially preferably 2% to 8%. If the content of $Al_2O_3$ is too high, the meltability tends to decrease. The ultraviolet transmittance may also become too high.

$Li_2O$, $Na_2O$ and $K_2O$ are components that decrease the melting temperature to improve the meltability and decrease the softening point. However, if the content of these components is too high, the weather resistance tends to decrease and the emission intensity tends to decrease over time due to irradiation with ultraviolet light being the excitation light. Thus, the content of $Li_2O+Na_2O+K_2O$ is preferably 0% to 10%, more preferably 0% to 5%, still more preferably 0% to 3%, even more preferably 0% to 2%, especially preferably 0% to 1%, and most preferably not to containing $Li_2O$, $Na_2O$ and $K_2O$. The content of each of the components $Li_2O$, $Na_2O$ and $K_2O$ is preferably 0% to 7%, more preferably 0% to 5%, still more preferably 0% to 3%, even more preferably 0% to 2%, especially preferably 0% to 1%, and most preferably not to containing each of the components $Li_2O$, $Na_2O$ and $K_2O$.

When $CeO_2$ is contained in the glass composition, this can suppress the decrease in emission intensity over time due to irradiation with ultraviolet light even if $Li_2O$, $Na_2O$ or $K_2O$ is contained, as will be described later. Thus, when $CeO_2$ is contained in the glass composition, $Li_2O$, $Na_2O$ or $K_2O$ may be proactively contained. In this case, the (total) content of $Li_2O$, $Na_2O$ and $K_2O$ is preferably 0.1% to 7%, more preferably 1% to 6.5%, and still more preferably 2% to 6%. The contents of $Li_2O$, $Na_2O$ and $K_2O$ are each preferably 0% to 7%, more preferably 0.1% to 5%, still more preferably 0.5% to 4%, and especially preferably 1% to 3%. $Li_2O$, $Na_2O$ and $K_2O$ are preferably used in combination of two or more, particularly three. Specifically, the content of each of $Li_2O$, $Na_2O$ and $K_2O$ is preferably 0.1% or more, more preferably 0.5% or more, and especially preferably 1% or more. By doing so, the softening point can be efficiently decreased due to the mixed alkali effect. The mixed alkali effect can be easily obtained when the contents of the alkali oxides are equal.

MgO, CaO, SrO and BaO are components that decrease the melting temperature, improve the meltability, and decrease the softening point. Unlike alkali metal components, these components do not affect the decrease of the emission intensity of the wavelength conversion member over time. The content of MgO+CaO+SrO+BaO is preferably 0% to 45%, more preferably 1% to 45%, and still more preferably 5% to 40%, even more preferably 10% to 35%, and especially preferably 20% to 33%. If the content of MgO+CaO+SrO+BaO is too low, it is difficult to decrease the softening point. On the other hand, if the content of MgO+CaO+SrO+BaO is too high, the weather resistance tends to decrease. The content of each of MgO, CaO, SrO and BaO is preferably 0% to 35%, more preferably 0.1% to 33%, and still more preferably 1% to 30%. If the content of these components is too high, the weather resistance tends to decrease.

ZnO is a component that decreases the melting temperature and improves the meltability. The content of ZnO is preferably 0% to 15%, more preferably 0% to 10%, still more preferably 0% to 5%, especially preferably 0.1% to 4.5%, and most preferably 1% to 4%. If the content of ZnO is too high, the weather resistance tends to decrease. A phase separation also tends to occur, decreasing the transmittance and thus resulting in decreasing the emission intensity.

$CeO_2$ is a component that decreases the ultraviolet transmittance of the glass matrix. Containing $CeO_2$ can limit leakage of ultraviolet excitation light out of the wavelength conversion member. $CeO_2$ also has the effect of limiting the decrease in emission intensity over time due to $Li_2O$, $Na_2O$ or $K_2O$. The content of $CeO_2$ is preferably 0% to 10%, more preferably 0.001% to 10%, still more preferably 0.001% to 5%, even more preferably 0.01% to 3%, especially preferably 0.05% to 1%, and most preferably 0.1% to 0.5%. If the content of $CeO_2$ is too high, the visible light transmittance of the glass matrix tends to decrease, thus decreasing the emission intensity.

Various components other than those described above can be contained within a range that does not impair the effects of the present invention. For example, $P_2O_5$, $La_2O_3$, $Ta_2O_5$, $TeO_2$, $TiO_2$, $Nb_2O_5$, $Gd_2O_3$, $Y_2O_3$, $Sb_2O_3$, $SnO_2$, $Bi_2O_3$, $As_2O_3$, and $ZrO_2$ can each be contained in a range of preferably 15% or less, more preferably 10% or less, and still more preferably 5% or less, and 30% or less in total. F can also be contained. By containing F instead of the alkali metal components which are one of the causes of the formation of coloring centers, it is possible to limit the decrease in emission intensity over time while maintaining a low softening point, because F has the effect of decreasing the softening point. The content of F is preferably 0% to 10%, more preferably 0% to 8%, and still more preferably 0.1% to 5% in anion %.

The softening point of the glass matrix is preferably 600° C. to 1100° C., more preferably 630° C. to 1050° C., and still more preferably 650° C. to 1000° C. If the softening point of the glass matrix is too low, the mechanical strength and the weather resistance tend to decrease. On the other hand, if the softening point of the glass matrix is too high, the sintering temperature is also high and thus phosphor particles tend to deteriorate in the firing process during production.

The average particle diameter $D_{50}$ of glass powder which is the raw material of the glass matrix is preferably 100 μm or less, more preferably 50 μm or less, still more preferably 20 μm or less, and especially preferably 10 μm or less. If the average particle diameter $D_{50}$ of the glass powder is too large, bubbles tend to remain in the glass matrix after firing in the resulting wavelength conversion member, which may decrease the light extraction efficiency of the wavelength conversion member. Although the lower limit of the average particle diameter $D_{50}$ of the glass powder is not particularly limited, the lower limit is preferably 0.1 μm or more, more preferably 1 μm or more, and still more preferably 2 μm or more in consideration of production cost and handling. In the present specification, the average particle diameter refers to the average particle diameter $D_{50}$ measured by a laser diffraction particle size distribution analyzer.

Examples of ceramics that form the ceramic matrix include $Al_2O_3$, MgO and AlN.

Phosphor particles are not particularly limited and preferably emit fluorescence in the visible range (for example, wavelengths of 500 nm to 600 nm) when irradiated with excitation light having a wavelength of 200 nm to 380 nm. Specifically, examples of phosphor particles include those of, for example, an oxide phosphor, a nitride phosphor, an oxynitride phosphor, a chloride phosphor, an oxychloride phosphor, a halide phosphor, an aluminate phosphor, and a halophosphate phosphor. Among them, a garnet phosphor, especially $Lu_3Al_5O_{12}$:Ce, and a sialon phosphor, especially $Si_{6-z}Al_zO_zN_{8-z}$:Eu ($0<z<4.2$) (β-SiAlON:Eu), are preferable because they can efficiently convert excitation light having a wavelength of 200 nm to 380 nm into fluorescence in the visible range. Phosphor particles that do not have an excitation band in the visible range can also be used to convert only ultraviolet light. In that case, only ultraviolet light can be converted even in an environment where visible light and ultraviolet light are irradiated, such that the UV sensor head 1 that detects only ultraviolet light can be provided more reliably.

The average particle diameter of the phosphor particles is preferably 1 μm or more, more preferably 5 μm or more. If the average particle diameter of the phosphor particles is too small, the quantum efficiency tends to be poor, decreasing the emission intensity. On the other hand, if the average particle diameter of the phosphor particles is too large, the dispersion state in the inorganic matrix tends to deteriorate, making the emission color non-uniform. Thus, the average particle diameter of the phosphor particles is preferably 50 μm or less, more preferably 25 μm or less.

The wavelength conversion member of the present invention can be produced, for example, by firing a mixture that contains glass powder which is the raw material of a glass matrix and phosphor particles (phosphor powder), and cutting the resulting fired body into a desired size.

The firing temperature of the powder mixture of glass powder and phosphor powder is preferably within ±200° C. of the softening point of the glass powder, especially preferably within ±150° C. of the softening point of the glass powder. If the firing temperature is too low, the glass powder will not be sufficiently fluid, making it difficult to obtain a dense sintered body. On the other hand, if the firing temperature is too high, the phosphor component may thermally deteriorate, decreasing the emission intensity.

Firing is preferably performed in a reduced-pressure atmosphere. Specifically, the atmosphere during firing is preferably less than $1.013\times10^5$ Pa, more preferably 1000 Pa or less, and still more preferably 400 Pa or less. This can reduce the amount of air bubbles remaining in the wavelength conversion member and improve the emission intensity for the reasons described above. The entire firing process may be performed in a reduced-pressure atmosphere, or for example, only the firing process may be performed in a reduced-pressure atmosphere and a temperature-increasing process and a temperature-decreasing process before and after the firing process may be performed in an atmosphere other than the reduced-pressure atmosphere (for example, under atmospheric pressure).

Hereinafter, the present invention will be described in more detail based on specific examples. The present invention is by no means limited to the following examples and can be modified as appropriate without changing the gist of the invention.

Example 1

Glass powder having a composition, in mass %, of 68% $SiO_2$, 4% $Al_2O_3$, 19% $B_2O_3$, 7% $Na_2O$, 1% $K_2O$, and 1% $F_2$ (with a softening point of 700° C., a thermal expansion coefficient of $41.9\times10^{-7}$/° C., and an average particle diameter of 2.5 μm) was prepared as glass powder that will form a glass matrix.

$La_3Si_6N_{11}:Ce^{3+}$ phosphor particles (with a fluorescence peak wavelength of 538 nm) were mixed with the prepared glass powder and the mixture was fired at a temperature of 100° C. plus the softening point of glass to obtain a sintered body. The phosphor particles were mixed such that the content in the wavelength conversion member was 0.1 volume %. The sintered body was processed to obtain a cylindrical wavelength conversion member with a length of 3 mm and a diameter of Φ2.0 mm.

Example 2

A wavelength conversion member was obtained in the same manner as in Example 1, except that the phosphor particles were mixed such that the content in the wavelength conversion member was 0.5 volume %.

Example 3

A wavelength conversion member was obtained in the same manner as in Example 1, except that the phosphor particles were mixed such that the content in the wavelength conversion member was 1.0 volume %.

Example 4

A wavelength conversion member was obtained in the same manner as in Example 1, except that the phosphor particles were mixed such that the content in the wavelength conversion member was 1.5 volume %.

Example 5

A wavelength conversion member was obtained in the same manner as in Example 1, except that the phosphor particles were mixed such that the content in the wavelength conversion member was 3.5 volume %.

Example 6

A wavelength conversion member was obtained in the same manner as in Example 1, except that the phosphor particles were mixed such that the content in the wavelength conversion member was 5.0 volume %.

Example 7

A wavelength conversion member was obtained in the same manner as in Example 1, except that the phosphor particles were mixed such that the content in the wavelength conversion member was 10.0 volume %.

Example 8

A wavelength conversion member was obtained in the same manner as in Example 1, except that the phosphor particles were mixed such that the content in the wavelength conversion member was 15.0 volume %.

Example 9

A wavelength conversion member was obtained in the same manner as in Example 1, except that the phosphor particles were mixed such that the content in the wavelength conversion member was 20.0 volume %.

Evaluation

The wavelength conversion members obtained in Examples 1 to 9 were each attached to the lid member 3 as the wavelength conversion member 4 illustrated in FIGS. 2 and 3 to obtain the UV sensor head 1. The obtained UV sensor head 1 was irradiated with ultraviolet light using an ultraviolet light source (with a wavelength of 365 nm). Note that ultraviolet light irradiation was performed in a dark room. The converted visible light was guided to a spectroscope (made by Ocean Photonics, product number "USB-2000+") through an optical fiber 11 and detected by the spectroscope.

Figure 6:
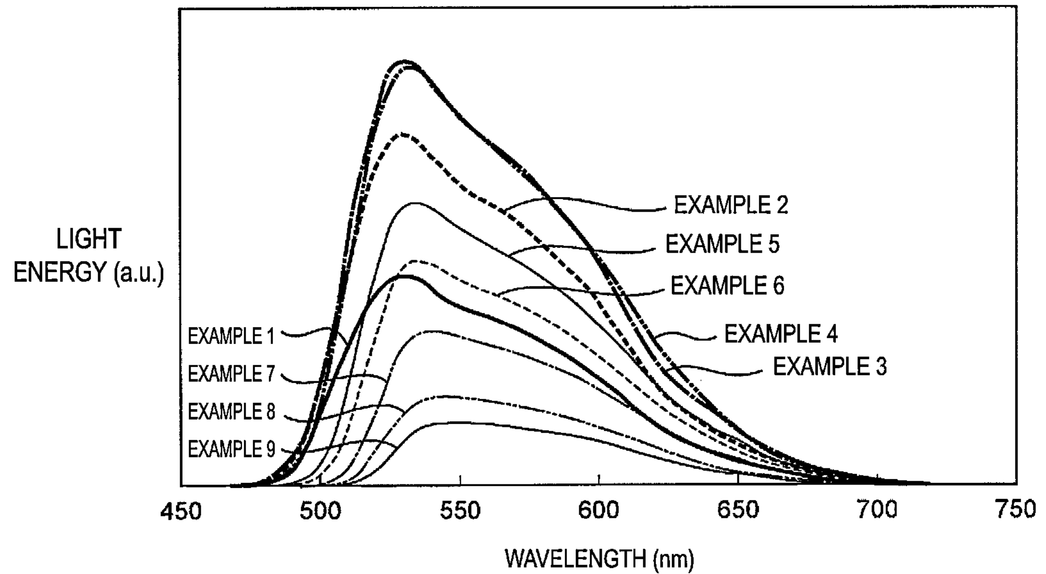
FIG. 6 is a graph showing distribution spectra of light energy detected using wavelength conversion members of Examples 1 to 9.

FIG. 6 is a graph showing distribution spectra of light energy detected using the wavelength conversion members of Examples 1 to 9. The vertical axis in FIG. 6 is relative light energy (a.u.) and the horizontal axis is wavelength.

As shown in FIG. 6, it was found that the UV sensor heads using the wavelength conversion members obtained in Examples 1 to 9 had increased sensing sensitivity. In particular, it can be seen that Examples 1 to 7 in which the concentration of phosphor particles is in a range of 0.1 to 10.0 volume % efficiently increase sensing sensitivity.

Example 10

A wavelength conversion member produced in the same manner as in Example 4 was attached to the lid member 3 as the wavelength conversion member 4 illustrated in FIGS. 2 and 3 to obtain the UV sensor head 1. Separately, the UV sensor head 1A illustrated in FIG. 4 was obtained by installing the filter 5 that transmits ultraviolet light and absorbs visible light in the cutout portion 2*d* of the UV sensor head 1 produced in the same manner. A glass plate with a thickness of 0.5 mm made of phosphate glass that contains 11% NiO and 4.5% CoO in mass % was used as the filter 5.

Evaluation

The obtained UV sensor heads 1 and 1A were irradiated with ultraviolet light using an ultraviolet light source (with a wavelength of 365 nm). Ultraviolet light irradiation was performed under a fluorescent lamp. Converted light from the wavelength conversion member guided to the optical fiber 11 and ambient light from the fluorescent lamp were detected by a spectroscope (made by Ocean Photonics, product number "USB-2000+").

Figure 7:
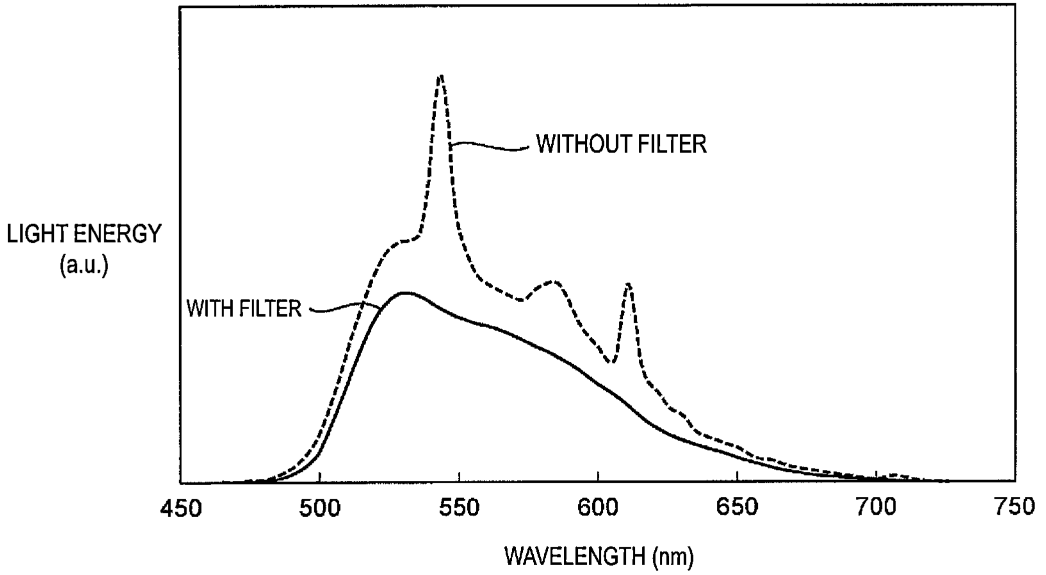
FIG. 7 is a graph showing distribution spectra of light energy detected using a UV sensor head 1 and a UV sensor head 1A in Example 10.

FIG. 7 is a graph showing distribution spectra of light energy detected using the UV sensor heads 1 and 1A. The vertical axis in FIG. 7 is relative light energy (a.u.) and the horizontal axis is wavelength.

The UV sensor head 1 in which the filter 5 is not provided on the cutout portion 2*d* detected an increase in fluorescence intensity due to the phosphor being excited by visible light or the like contained in the fluorescent lamp and a plurality of fluorescence peaks originated from the fluorescent lamp as noise as illustrated in FIG. 7. On the other hand, the UV sensor head 1A in which the filter 5 was provided on the cutout portion 2*d* hardly detected such noise and was able to accurately detect ultraviolet light from the ultraviolet light source. Thus, by installing a filter in the cutout portion of the UV sensor head, it was possible to provide a UV sensor head that detects only predetermined ultraviolet light even when used under a visible light source such as a fluorescent lamp.

REFERENCE SIGNS LIST

1, 1A UV sensor head
2 Tubular body
2*a* First end
2*b* Second end
2*c* Side surface
2*d* Cutout portion
3 Lid member
4 Wavelength conversion member
4*a* Protrusion
5 Filter
10 UV sensor
11 Optical fiber
11*a* Connector
12 Detector

The invention claimed is:

1. A UV sensor head that converts ultraviolet light into visible light and guides the converted visible light toward an optical fiber, the UV sensor head comprising:

a wavelength conversion member including an inorganic matrix and phosphor particles dispersed in the inorganic matrix; wherein a content of the phosphor particles in the wavelength conversion member is 0.01 volume % or more and 5 volume % or less.

2. The UV sensor head according to claim 1, further comprising:

a tubular body having a first end and a second end facing each other, and a side surface connecting the first end and the second end, the side surface being provided with a cutout portion, wherein the wavelength conversion member is housed inside the tubular body, and the wavelength conversion member is arranged to overlap the cutout portion in a plan view.

3. The UV sensor head according to claim 2, wherein, when a direction in which the first end and the second end are connected is defined as a lengthwise direction and the first end is an end provided on to the optical fiber side, the wavelength conversion member has a protrusion that protrudes toward the first end side beyond the cutout portion in the lengthwise direction.

4. The UV sensor head according to claim 3, wherein a ratio of a length of the protrusion of the wavelength conversion member to a length of the cutout portion in the lengthwise direction (protrusion/cutout portion) is 0.01 or more and 1 or less.

5. The UV sensor head according to claim 2, wherein a filter that transmits ultraviolet light and absorbs or reflects visible light is provided on the cutout portion.

6. The UV sensor head according to claim 5, wherein the filter is made of glass.

7. The UV sensor head according to claim 2, wherein, when the first end is an end provided on the optical fiber side, a rod made of the wavelength conversion member is inserted from the second end side of the tubular body.

8. The UV sensor head according to claim 7, further comprising:

a lid member closing the second end side of the tubular body, wherein the rod is attached to the lid member.

9. The UV sensor head according to claim 1, wherein the inorganic matrix is a glass matrix.

10. A wavelength conversion member for a UV sensor head, the wavelength conversion member being used for a UV sensor head that converts ultraviolet light into visible light and guides the converted visible light toward an optical fiber, the wavelength conversion member comprising:

an inorganic matrix and phosphor particles dispersed in the inorganic matrix; wherein a content of the phosphor particles in the wavelength conversion member is 0.01 volume % or more and 5 volume % or less.

11. A UV sensor head that converts ultraviolet light into visible light and guides the converted visible light toward an optical fiber, the UV sensor head comprising:

a wavelength conversion member including an inorganic matrix and phosphor particles dispersed in the inorganic matrix; and a tubular body having a first end and a second end facing each other, and a side surface connecting the first end and the second end, the side surface being provided with a cutout portion; wherein the wavelength conversion member is housed inside the tubular body, and the wavelength conversion member is arranged to overlap the cutout portion in a plan view.

12. The UV sensor head according to claim 11, wherein, when a direction in which the first end and the second end are connected is defined as a lengthwise direction and the first end is an end provided on to the optical fiber side, the wavelength conversion member has a protrusion that protrudes toward the first end side beyond the cutout portion in the lengthwise direction.

13. The UV sensor head according to claim 12, wherein a ratio of a length of the protrusion of the wavelength conversion member to a length of the cutout portion in the lengthwise direction (protrusion/cutout portion) is 0.01 or more and 1 or less.

14. The UV sensor head according to claim 11, wherein a filter that transmits ultraviolet light and absorbs or reflects visible light is provided on the cutout portion.

15. The UV sensor head according to claim 14, wherein the filter is made of glass.

16. The UV sensor head according to claim 11, wherein, when the first end is an end provided on the optical fiber side, a rod made of the wavelength conversion member is inserted from the second end side of the tubular body.

17. The UV sensor head according to claim 16, further comprising:

a lid member closing the second end side of the tubular body, wherein the rod is attached to the lid member.

18. The UV sensor head according to claim 11, wherein the inorganic matrix is a glass matrix.

* * * * *